United States Patent
Wang et al.

(10) Patent No.: US 9,426,676 B2
(45) Date of Patent: Aug. 23, 2016

(54) METHOD AND APPARATUS FOR ENHANCING COVERAGE

(71) Applicant: NEC (CHINA) CO., LTD., Beijing (CN)

(72) Inventors: Gang Wang, Beijing (CN); Zhennian Sun, Beijing (CN); Ming Lei, Beijing (CN)

(73) Assignee: NEC(CHINA) CO., Ltd., Beijing (CN)

( * ) Notice: Subject to any disclaimer, the term of this patent is extended or adjusted under 35 U.S.C. 154(b) by 82 days.

(21) Appl. No.: 14/385,025

(22) PCT Filed: Sep. 25, 2012

(86) PCT No.: PCT/CN2012/081943
§ 371 (c)(1),
(2) Date: Sep. 12, 2014

(87) PCT Pub. No.: WO2014/047788
PCT Pub. Date: Apr. 3, 2014

(65) Prior Publication Data
US 2015/0036561 A1 Feb. 5, 2015

(51) Int. Cl.
*H04W 24/02* (2009.01)
*H04W 72/04* (2009.01)
*H04L 5/14* (2006.01)
*H04L 1/18* (2006.01)

(52) U.S. Cl.
CPC .............. *H04W 24/02* (2013.01); *H04L 1/18* (2013.01); *H04L 5/14* (2013.01); *H04W 72/0446* (2013.01); *H04W 72/0406* (2013.01)

(58) Field of Classification Search
CPC ............ H04W 24/02; H04W 72/0446; H04W 72/0406; H04L 5/14; H04L 1/18
See application file for complete search history.

(56) References Cited

U.S. PATENT DOCUMENTS

2011/0075611 A1* 3/2011 Choi ................... H04L 1/1819
370/329

(Continued)

FOREIGN PATENT DOCUMENTS

| CN | 101389120 A | 3/2009 |
|---|---|---|
| CN | 101567773 A | 10/2009 |
| CN | 101925110 A | 12/2010 |

OTHER PUBLICATIONS

International Search Report of PCT/CN2012/081943 dated Jul. 4, 2013 [PCT/ISA/210].

(Continued)

*Primary Examiner* — Brian D Nguyen
(74) *Attorney, Agent, or Firm* — Sughrue Mion, PLLC

(57) ABSTRACT

Embodiments of the disclosure provide a method and apparatus for enhancing coverage in a TDD system, wherein there is at least one TDD UL/DL configuration for subframes in the TDD system, and the at least one UL/DL configuration comprises at least one special subframe and at least one normal subframe. In the method according to embodiments of the present invention, whether a special subframe is to be applied in TTI bundling is determined first, and then a message with an indication indicating that a special subframe is to be applied in TTI bundling is sent to a UE in response to determining that a special subframe is to be applied in TTI bundling, such that the UE transmits TTI bundling packets on at least one special subframe.

22 Claims, 5 Drawing Sheets

(56) References Cited

U.S. PATENT DOCUMENTS

| | | | |
|---|---|---|---|
| 2011/0085519 A1* | 4/2011 | Koivisto | H04J 13/00 370/335 |
| 2012/0039280 A1* | 2/2012 | Chen | H04L 1/1861 370/329 |
| 2012/0093040 A1 | 4/2012 | Wu et al. | |
| 2012/0155337 A1* | 6/2012 | Park | H04L 1/1692 370/280 |
| 2013/0044617 A1* | 2/2013 | Boixadera | H04W 56/0045 370/252 |
| 2013/0083736 A1* | 4/2013 | Yin | H04W 72/0446 370/329 |
| 2013/0242816 A1* | 9/2013 | He | H04L 5/1469 370/280 |
| 2013/0301433 A1* | 11/2013 | Yin | H04W 16/02 370/252 |

OTHER PUBLICATIONS

Communication dated Sep. 10, 2015, from the European Patent Office in counterpart application No. 12885559.0.

3GPP TSG RAN WG1 #69, "Coverage enhancement for TTI bundling", CMCC, Draft R1-122719, Agenda 7.9.1, pp. 1-7 (7 pages total), May 21-25, 2012.

3GPP TSG RAN WG1, "ACK/NACKs transmission in UpTPS", CATT, Draft R080175, Agenda Item 6.1.7, pp. 1-7 (7 pages total), Jan. 14-18, 2008.

3GPP TSG RAN WG1 #68BIS, "Discussion on additional special subframe configuration", CMCC, Draft R1-121712, Agenda 7.10 pp. 1-6 (6 pages total), Mar. 26-30, 2012.

3GPP TSG RAN WG1, "Additional special subframe configuration for LTE TDD", Samsung, Draft R1-121651, Agenda Item 7.7, pp. 1-5 (5 pages), Mar. 26-30, 2012.

* cited by examiner

METHOD AND APPARATUS FOR ENHANCING COVERAGE

CROSS REFERENCE TO RELATED APPLICATIONS

This is a National Stage of International Application No. PCT/CN2012/081943 filed Sep. 25, 2012, the content of all of which is incorporated herein by reference in its entirety.

FIELD OF THE INVENTION

Embodiments of the present invention generally relate to communication techniques. More particularly, embodiments of the present invention relate to a method and apparatus for enhancing coverage in a TDD system.

BACKGROUND OF THE INVENTION

3GPP LTE and LTE-Advanced (LTE-A) are one of the next generation cellular communication standards, which create a new series of specifications for the new evolving radio-access technology. With respect to multiplexing solutions, LTE and LTE-Advanced provide two modes, Frequency Division Duplex (FDD) and Time Division Duplex (TDD).

In LTE release 8, Transmission Time Interval (TTI) bundling has been introduced to improve the cell coverage. Coverage benefit has been observed from TTI bundling enhancements for uplink (UL) VoIP and medium size traffic. TTI bundling is generally supported by the FDD system and the TDD system with UL/DL configurations 0, 1 and 6.

So far, a subframe configuration comprising 5 downlink (DL) subframes and 2UL subframes, as well as special subframes, is used in TD-SCDMA network (R1-121712, CMCC) in F band (1880-1920 MHz) and A band (2010-2025 MHz). For a scenario between a TDD system and the TD-SCDMA network, wherein the TDD system is deployed in either F band, A band or E band (2300-2400 MHz), a coexistence problem shall be taken into account.

Since the TD-SCDMA network usually uses a configuration of 5DL/2UL subframes, the most suitable UL/DL configuration for LTE TDD system or TD-LTE or TD-LTE-Advanced is configuration 2. However, for configuration 2, it can't use TTI bundling to improve the cell coverage.

In view of the foregoing problem, there is a need to find a solution for performing TTI bundling with configuration 2 and/or more UL/DL configurations, so as to enhance coverage in the TDD system.

SUMMARY OF THE INVENTION

The present invention proposes a method and apparatus for enhancing coverage in a TDD system. Specifically, the present invention provides a solution for performing TTI bundling with UL/DL configurations 2, as well as configurations 3, 4 and 5, to enhance coverage in the TDD system.

According to a first aspect of the present invention, embodiments of the invention provide a method for enhancing coverage in a TDD system, wherein there is at least one TDD UL/DL configuration for subframes in the TDD system, and the at least one UL/DL configuration comprises at least one special subframe and at least one normal subframe. The method may comprise steps of: determining whether a special subframe is to be applied in TTI bundling; and in response to determining that a special subframe is to be applied in TTI bundling, sending to a user equipment (UE) a message with an indication indicating that a special subframe is to be applied in TTI bundling, such that the UE transmits TTI bundling packets on at least one special subframe.

According to a second aspect of the present invention, embodiments of the invention provide a method for enhancing coverage in a TDD system, wherein there is at least one TDD UL/DL configuration for subframes in the TDD system, and the at least one UL/DL configuration comprises at least one special subframe and at least one normal subframe. The method may comprise steps of: determining whether a message received from a base station (BS) includes an indication indicating that a special subframe is to be applied in TTI bundling; and in response to determining that the received message includes the indication, transmitting TTI bundling packets to the BS on at least one special subframe.

According to a third aspect of the present invention, embodiments of the invention provide an apparatus for enhancing coverage in a TDD system, wherein there is at least one TDD UL/DL configuration for subframes in the TDD system, and the at least one UL/DL configuration comprises at least one special subframe and at least one normal subframe. The apparatus may comprise: a first decider configured to determine whether a special subframe is to be applied in TTI bundling; and a sender configured to, in response to determining that a special subframe is to be applied in TTI bundling, send to a UE a message with an indication indicating that a special subframe is to be applied in TTI bundling, such that the UE transmits TTI bundling packets on at least one special subframe.

According to a fourth aspect of the present invention, embodiments of the invention provide an apparatus for enhancing coverage in a TDD system, wherein there is at least one TDD UL/DL configuration for subframes in the TDD system, and the at least one UL/DL configuration comprises at least one special subframe and at least one normal subframe. The apparatus may comprise: a second decider configured to determine whether a message received from a BS includes an indication indicating that a special subframe is to be applied in TTI bundling; and a transmitter configured to, in response to determining that the received message includes the indication, transmit TTI bundling packets to the BS on at least one special subframe.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, the term "BS" may represent, e.g., a node B (NodeB or NB), an evolved NodeB (eNodeB or eNB), a radio header (RH), a remote radio head (RRH), a relay, a low power node such as a femto, a pico, and so on.

Figure 1:
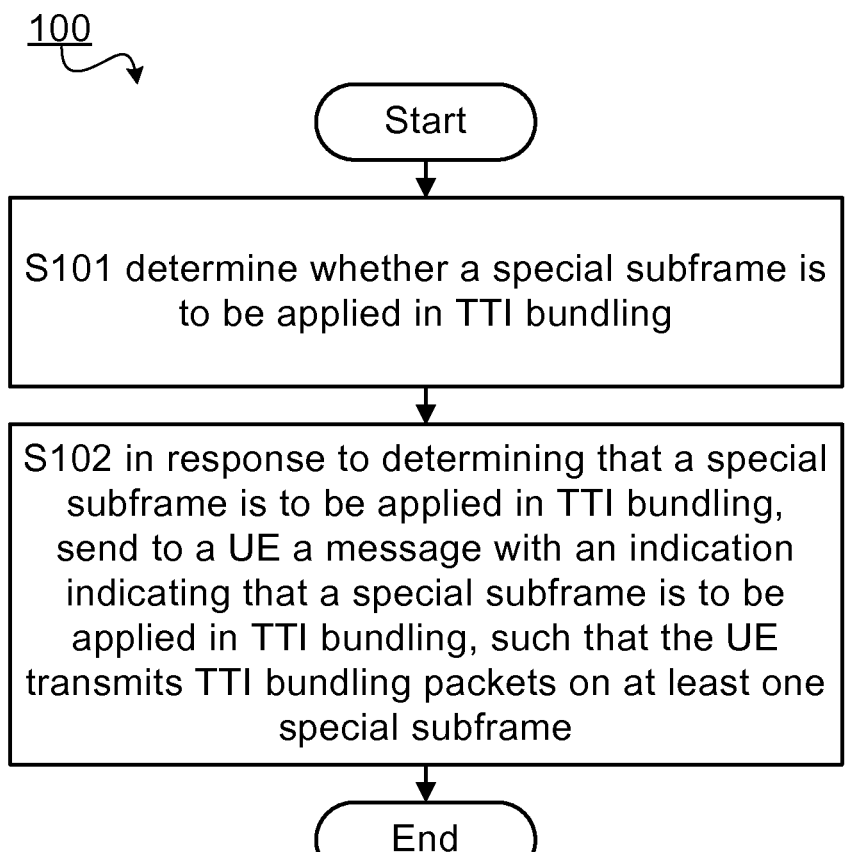
FIG. 1 illustrates a flow chart of a method for use in a BS for enhancing coverage in a TDD system according to embodiments of the invention.

Reference is first made to FIG. 1, which illustrates a flow chart of a method 100 for use in a BS for enhancing coverage in a TDD system according to embodiments of the invention. According to embodiments of the present invention, there is at least one TDD UL/DL configuration for subframes in the TDD system and the at least one UL/DL configuration comprises at least one special subframe and at least one normal subframe. In accordance with embodiments of the present invention, method 100 may be carried out by, for example, a BS, a base station controller (BSC), a gateway, a relay, a server, or any other applicable device.

In context of the disclosure, a normal subframe may be a subframe configured only for uplink transmission (also called as uplink subframe) or only for downlink transmission (also called as downlink subframe); and, a special subframe is a subframe which may be associated with both the uplink transmission and the downlink transmission but is not a normal uplink subframe or a normal downlink subframe. The special subframe may be used for downlink subframe and uplink subframe transition.

For better understanding, the following embodiments of the present disclosure are described based on a LTE TDD system. As can be appreciated by those skilled in the art, the present disclosure can be applicable to any other suitable communication system.

For a LTE TDD system, there are seven different patterns of uplink/downlink switching, termed UL/DL configurations 0 through 6. The LTE TDD system allows for asymmetric UL/DL allocations by the seven different uplink-downlink configurations. Table 1 shows the seven UL/DL configurations.

TABLE 1

| UL/DL configurations | | | | | | | | | | |
|---|---|---|---|---|---|---|---|---|---|---|
| UL/DL configuration | Subframe Number | | | | | | | | | |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, a subframe denoted as "D" means that the subframe is for downlink, a subframe denoted as "U" means that the subframe is for uplink, and a subframe denoted as "S" means that the subframe is a special subframe, which comprises a Downlink Pilot Time Slot (DWPTS), a guard period (GP), an Uplink Pilot Time Slot (UPPTS). Both the "D" and "U" subframe is a normal subframe according to embodiments of the present invention, and the "S" subframe is an example of the special subframe according to embodiments of the present invention.

At step S101, whether a special subframe is to be applied in TTI bundling is determined.

The determination on whether a special subframe is to be applied in the TTI bundling may be made by the BS according to current condition of the TDD system, for example, resource allocation, interference, signal quality, etc. As an alternative, the BS may first judge whether the BS and the UE have agreed to perform TTI bundling by using the special subframe, and if yes, the BS may determine that a special subframe is to be applied in TTI bundling.

At step S102, in response to determining that a special subframe is to be applied in TTI bundling, a message with an indication indicating that a special subframe is to be applied in TTI bundling is sent to a UE, such that the UE transmits TTI bundling packets on at least one special subframe.

In embodiments of the present invention, the indication indicating that a special subframe is to be applied in TTI bundling may be briefly referred to as a "positive indication".

The positive indication may be implemented in various forms. For example, the positive indication may be set as "TRUE" in response to determining that a special subframe is to be applied in TTI bundling. Then the message including the flag "TURE" may be sent to the UE, to notify the UE to transmit TTI bundling packets by using special subframe(s). According to some other embodiments of the preset invention, the positive indication may be predefined with a specific value, if the UE determines the message sent from the BS includes the predefined value, e.g., 0 or 1, the UE will understand that the BS want to perform TTI bundling by using a special subframe.

In accordance with embodiments of the present invention, in response to determining that a special subframe is not to be applied in TTI bundling, the message without the indication may be sent to the UE, such that the UE transmits TTI bundling packets only on normal subframes. In this case, the message does not include the positive indication, e.g., "TRUE". When the UE received such a message, it can not find the positive indication, and thus may know that the BS does not want to perform TTI bundling with a special subframe. As an alternative, the BS may sent a message including a negative indication, e.g., "FALSE" to the UE, so as to provide a more explicit notification.

According to embodiments of the present invention, the message with or without the positive indication may be implemented as a Radio Resource Control (RRC) signaling. In an embodiment, in step S102, a RRC signaling may be configured as including the indication and then the RRC signaling may be sent to the UE. It is to be noted that, the message according to embodiments of the present invention may be implemented in other suitable forms, and the RRC signaling is an example, rather than limitation.

As mentioned above, when the UE receives a message with the positive indication, the UE will perform TTI bundling with a special subframe; and when the UE receive a message without the positive indication, the UE will not perform TTI bundling with a special subframe. With regard to the latter case, although the message does not include the positive indication, the message may further comprise a negative indication. In response to the negative indication, the UE may not perform TTI bundling with a special subframe, but perform normal TTI bundling, e.g., the TTI bundling scheme defined in LTE specifications. As an alternative, in response to the negative indication the UE may not perform any TTI bundling scheme at all.

In accordance with embodiments of the present invention, when the UE perform TTI bundling on the special subframe, it will configure redundancy versions for the TTI bundling packets. The first subframe used in the TTI bundling may be a special subframe or a normal subframe. A sequence of redundancy versions used in the TTI bundling may be set according to an arrangement of subframes. According to embodiments of the present invention, if a subframe used in the TTI bundling is a normal subframe, a redundancy version with high priority may be assigned to the subframe; and if a subframe used in the TTI bundling is a special subframe, a redundancy version with low priority may be assigned to the subframe. In an embodiment, assuming that there are 4 redundancy versions employed in TTI bundling, if subframes for the 4 redundancy versions is arranged as "S U S U", the sequence of the 4 redundancy versions may be "3, 0, 1, 2", wherein "0", "1", "2" and "3" represent indexes of the redundancy versions respectively. In another embodiment, if subframes for transmitting the 4 redundancy versions is arranged as "U S U S", the sequence of the 4 redundancy versions may be "0, 3, 2, 1".

To enable a special subframe to be applicable to be used in a TTI bundling scheme, embodiments of the present invention propose a structure for the special subframe. In accordance with embodiments of the present invention, the special subframe may comprise a first portion associated with downlink transmission, a second portion associated with a separation for transition of the downlink transmission and uplink transmission, and a third portion associated with the uplink transmission, wherein the length of the third portion is set long enough to ensure that the uplink transmission of the UE has minimum interference on downlink transmission in an adjacent system. According to embodiments of the present invention, the length of the third portion is half of the length of the special subframe.

Figure 5:
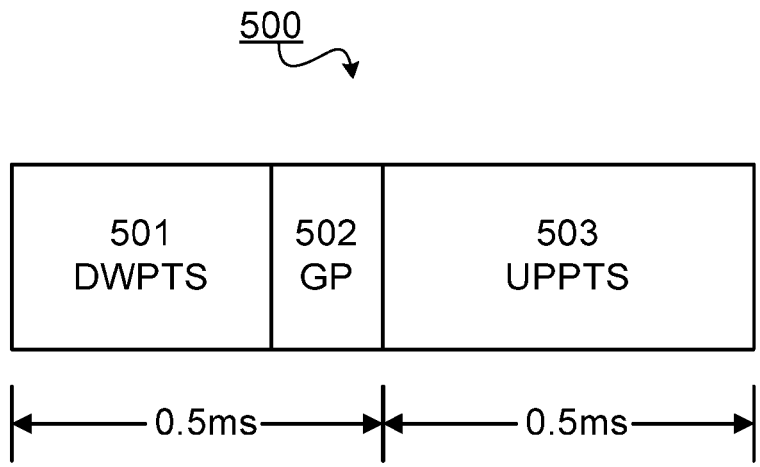
FIG. 5 illustrates a diagram of a special subframe according to embodiments of the invention.

Reference is now made to FIG. 5, which illustrates a diagram of a special subframe 500 according to embodiments of the invention. As shown in FIG. 5, the special subframe 500 comprise a first portion, DWPTS 501, a second portion, GP 502, and a third portion, UPPTS 503. In an embodiment of the present invention, assuming that the length of one subframe is 1 ms, the length of UPPTS 503 may be set as approximately 0.5 ms, while the length of the combination of DWPTS 501 and GP 502 is approximately 0.5 ms.

Figure 6A:
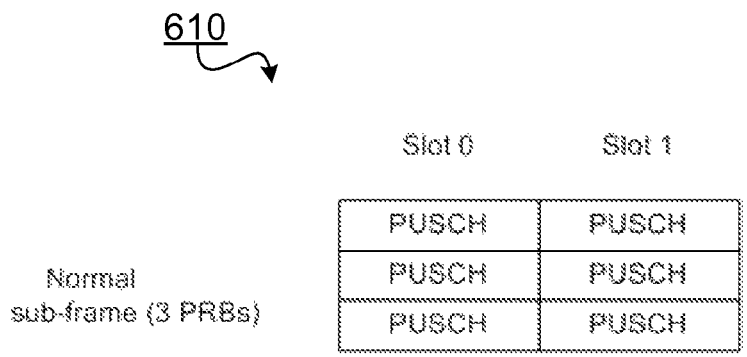
FIG. 6A illustrates a diagram of resource allocation for a normal subframe according to embodiments of the invention.

According to embodiments of the present invention, the number of resource blocks allocated to the special subframe may be the double of the number of resource blocks allocated to a normal subframe. Reference is now made to FIG. 6A, which illustrates a diagram of resource allocation for a normal subframe according to embodiments of the invention. In the embodiments illustrated with respect to FIG. 6A, the normal subframe is an uplink subframe, e.g., "U" subframe in a LTE TDD system, which comprises two slots, Slot 0 and Slot 1, both of them being used for uplink transmission. As shown, three resource blocks, e.g. 3 physical resource blocks (PRBs), are allocated to each subframe. The uplink transmission is performed on Physical Uplink Shared Channel (PUSCH).

Figure 6B:
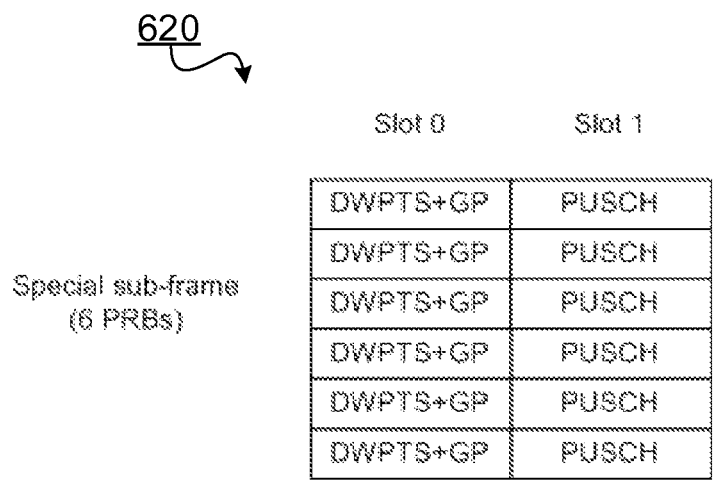
FIG. 6B illustrates a diagram of resource allocation for a special subframe according to embodiments of the invention.

Reference is now made to FIG. 6B, which illustrates a diagram of resource allocation for a special subframe according to embodiments of the invention. In the embodiments illustrated with respect to FIG. 6B, the special subframe is for example the "S" subframe in the LTE TDD system, which also comprises two slots, Slot 0 and Slot 1. Different from the normal subframe shown in FIG. 6A, in the special subframe, only Slot 1 is used for uplink transmission, because Slot 0 is assigned for DWPTS and GP. As shown, six resource blocks, e.g. 6 PRBs, are allocated to each subframe. In this way, there are also six resource blocks for uplink transmission.

When the special subframe according to embodiments of the present invention is applied to the UL/DL configurations 0 to 6, not only the UL/DL configurations 0, 1 and 6 that have supported TTI bundling, but also the UL/DL configurations 2, 3, 4, and 5 which are not qualified for TTI bundling, may employ the TTI bundling scheme. According to some embodiments of the present invention, the number of HARQ processes for the TTI bundling with respect to any of UL/DL configurations 2, 3 and 4 may be up to 2.

Figure 7:
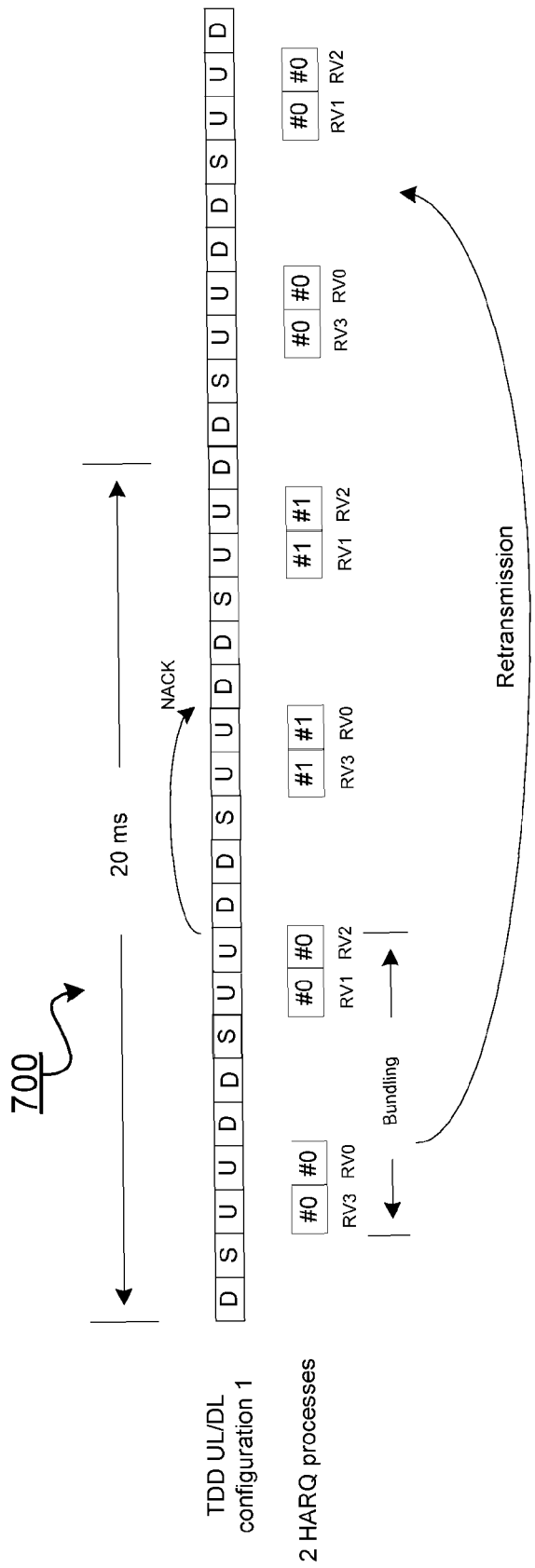
FIG. 7 illustrates a diagram of HARQ processes according to embodiments of the invention.

Reference is now made to FIG. 7, which illustrates a diagram of HARQ processes 700 according to embodiments of the invention. Specifically, in the embodiments shown with FIG. 7, TDD UL/DL configuration 2 is employed in TTI bundling. As shown, there are 4 redundant versions (RVs), RV3, RV0, RV1 and RV2 bundled. The first redundant version, RV3, is transmitted from the UE to the BS on the first "S" subframe; next, the second redundant version, RV0, is transmitted to the BS on the first "U" subframe; subsequently, since there are three successive "D" subframe, there is no RV transmitted in uplink; after the three "D" subframe, another two "S" and "U" subframes are used to transmit the third and fourth redundant versions, RV1 and RV2. In this way, the first set (e.g., denoted as "#0") of 4 redundant versions has been transmitted in uplink on two special subframes and two normal subframes (uplink normal subframes). Then, a second set (e.g., denoted as "#1") of 4 redundant versions may be transmitted to the BS on the subsequent four "S" and/or "U" subframes. As shown in FIG. 7, after the first set of RVs has been transmitted, a response (e.g., ACK or NACK) may be received in a "D" subframe after a period of time. In the embodiments, when the UE receives a response of NACK, which indicates the BS does not properly receive the uplink packets, the UE will retransmit the first set of RVs. Hence, the UE may check the upcoming "S" subframe or "U" subframe for beginning the retransmission of the first set of RVs. However, since the second set of RVs is being transmitted, the upcoming "S" or "U" subframe will not be used for the retransmission of the first set. Instead, the UE will find other "S" subframe or "U" subframe which does not interfere with the second set of RVs. As shown in FIG. 7, the retransmission of the first set of RVs begins after the transmission of the second set.

In response to receipt of a positive indication (e.g., the indication named ttiBundling_special being "TURE"), the mapping to resource element (k, l) corresponding to the physical resource blocks assigned for transmission shall be in increasing order of first the index k, then the index 1, starting with the second slot (e.g. Slot 1) in the subframe. And if ttiBundling_special is set to be true, the uplink frequency hopping may be only configured to "inter-subframe".

According to embodiments of the present invention, there may be some changes occur with respect to configurations of the special subframe. For example, Table 4.2-1 of TS 36.211 may be changed as the following Table 2.

TABLE 2 configurations of Special Subframe

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | $12800 \cdot Ts$ | $15360 \cdot Ts$ | $15360 \cdot Ts$ |
| 9 | $13168 \cdot T_s$ | | | $10240 \cdot Ts$ | | |
| 10 | $13168 \cdot Ts$ | $15360 \cdot Ts$ | $15360 \cdot Ts$ | $7680 \cdot Ts$ | — | — |
| 11 | $10976 \cdot Ts$ | | | | | |
| 12 | $8784 \cdot Ts$ | | | | | |
| 13 | $6592 \cdot Ts$ | | | | | |

According to embodiments of the present invention, there may be some changes made to Table 8-1 of TS 36.213 in the case that the special subframe is applied in TTI bundling. Details are shown in Table 3.

TABLE 3

Number of synchronous UL HARQ processes for TDD

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | 2 |
| 3 | 3 | 2 |
| 4 | 2 | 2 |
| 5 | 1 | N/A |
| 6 | 6 | 3 |

According to embodiments of the present invention, there may be some changes made to Table 8-2 of TS 36.213. Details are shown in Tables 4 and 5. Table 4 shows the values of "k" for TDD UL/DL configurations 0-6 when TTI bundling using special subframe is disabled, wherein the symbol "k" indicates the number of subframes the UE will wait before sending the packets at n+k subframe.

TABLE 4 k for TDD configurations 0-6 when TTI bundling using special subframe is disabled

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 5 shows the values of "k" for TDD UL/DL configurations 2, 3, 4 and 5 when TTI bundling using special subframe is enabled.

TABLE 5 k for TDD configurations 2, 3, 4 and 5 when TTI bundling using special subframe is enabled

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 2 | | 5 | | 4 | | | 5 | | 4 | |
| 3 | 4 | | | | | | | 4 | 4 | 4 |
| 4 | | | | | | | | 4 | 4 | 4 |
| 5 | | | | | | | | 4 | 4 | |

According to embodiments of the present invention, there may be some changes made to Table 8-2a of TS 36.213 in the case that the special subframe is applied in TTI bundling. Details are shown in Table 6. Table 6 shows the values of "l" for TDD UL/DL configurations 0-6, wherein the symbol "l" indicates that UE receives ACK/NACK at n−l subframe.

TABLE 6

| | 1 for TDD configurations 0-6 | | | | | | | | | |
|---|---|---|---|---|---|---|---|---|---|---|
| TDD UL/DL | subframe number n | | | | | | | | | |
| Configuration | 0 | 1 | 2 | 3 | 4 | 5 | 6 | 7 | 8 | 9 |
| 0 | | 9 | 6 | | | | 9 | 6 | | |
| 1 | | | 2 | | 3 | | | 2 | | 3 |
| 2 | | | 3 | 3 | | | | 3 | | 3 |
| 3 | 1 | | | | | | | 7 | 3 | 1 |
| 4 | | | | | | | | 8 | 3 | 1 |
| 5 | | | | | | | | 9 | 3 | |
| 6 | | 5 | 5 | | | | 6 | 6 | | 8 |

According to embodiments of the present invention, there may be some changes made to Table 9.1.2-1 of TS 36.213 in the case that the special subframe is applied in TTI bundling. Details are shown in Tables 7 and 8. Table 7 shows the values of "$k_{PHICH}$" for TDD UL/DL configurations 0-6 when TTI bundling using special subframe is disabled, wherein "$k_{PHICH}$" indicates the number of subframes UE needs to wait to receive ACK/NACK after base station sending it out.

TABLE 7

| | $k_{PHICH}$ for TDD when TTI bundling using special subframe is disabled | | | | | | | | | |
|---|---|---|---|---|---|---|---|---|---|---|
| TDD UL/DL | subframe index n | | | | | | | | | |
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Table 8 shows the values of "$k_{PHICH}$" for TDD UL/DL configurations 2, 3, 4 and 5 when TTI bundling using special subframe is enabled.

TABLE 8

| | $k_{PHICH}$ for TDD UL/DL configurations 2, 3, 4 and 5 when TTI bundling using special subframe is enabled | | | | | | | | | |
|---|---|---|---|---|---|---|---|---|---|---|
| TDD UL/DL | subframe index n | | | | | | | | | |
| Configuration | 0 | 1 | 2 | 3 | 4 | 5 | 6 | 7 | 8 | 9 |
| 2 | | | 4 | 6 | | | | 4 | 6 | |
| 3 | | | 4 | 6 | 6 | 6 | | | | |
| 4 | | | 4 | 6 | 6 | | | | | |
| 5 | | | 4 | 6 | | | | | | |

Figure 2:
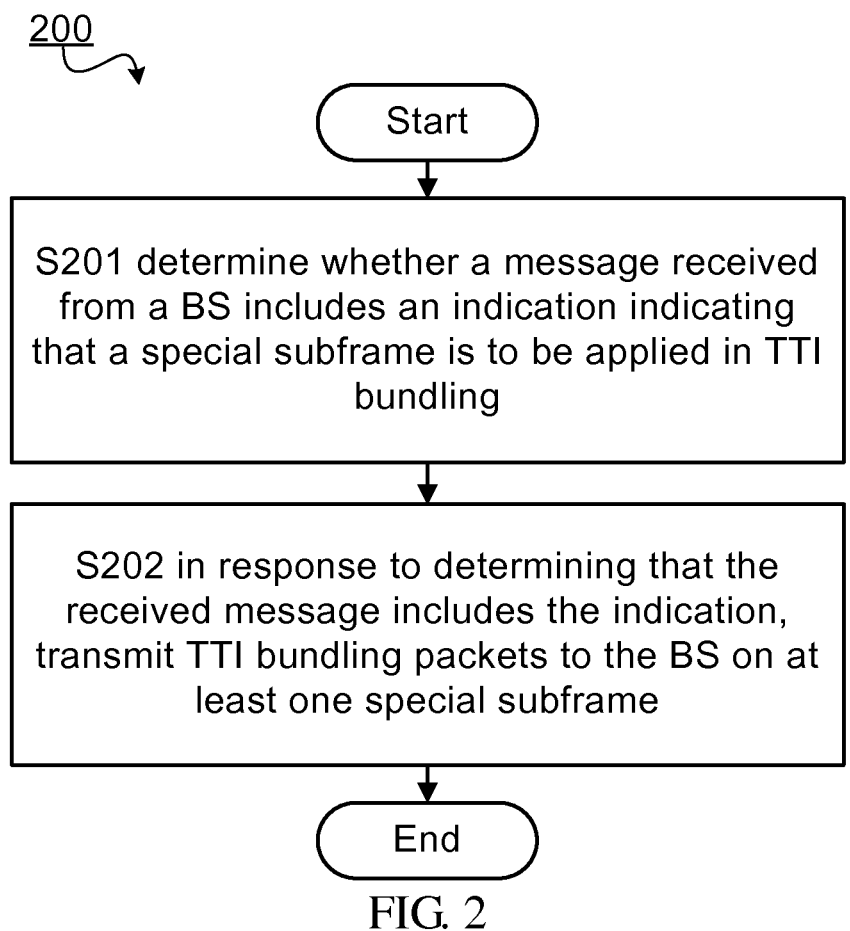
FIG. 2 illustrates a flow chart of a method for use in a UE for enhancing coverage in a TDD system according to embodiments of the invention.

Reference is now made to FIG. 2, which illustrates a flow chart of a method for use in a UE for enhancing coverage in a TDD system according to embodiments of the invention. In accordance with embodiments of the present invention, method 200 may be carried out by, for example, a UE, a terminal, a Mobile Station, or any other applicable device.

At step S201, whether a message received from a BS includes an indication indicating that a special subframe is to be applied in TTI bundling is determined.

According to embodiments of the present invention, the indication indicating that a special subframe is to be applied in TTI bundling may be also referred to as a positive indication, and the positive indication may be included in a RRC signaling sent from the BS. During the determination of step S201, a RRC signaling may be received from the BS and then whether the RRC signaling includes the indication may be determined.

At step S202, in response to determining that the received message includes the indication, TTI bundling packets are transmitted to the BS on at least one special subframe.

During step S202, according to some embodiments of the present invention, before transmitting the TTI bundling packets, the UE may determine an arrangement of subframes for the TTI bundling and set a sequence of redundancy versions used in the TTI bundling according to the arrangement of subframes.

In accordance with embodiments of the present invention, method 200 may further comprises a step of transmitting TTI bundling packets to the BS only on normal subframes in response to determining that the received message does not include the indication.

According to some embodiments of the present invention, the special subframe may comprise a first portion associated with downlink transmission, a second portion associated with a separation for transition of the downlink transmission and uplink transmission, and a third portion associated with the uplink transmission. In these embodiments, the length of the third portion may be set long enough to ensure that the uplink transmission of the UE has minimum interference on downlink transmission in an adjacent system. For example, the special subframe may be a "S" subframe defined in any of LTE TDD UL/DL configurations 0-6. At that time, the three portions comprised by the special subframe may be DWPTS, GP and UPPTS. In some embodiments, when the portion UPPTS corresponding to uplink transmission is longer than half of the length of the "S" subframe, interference on downlink transmission in adjacent system(s) may be increase. As such, according to embodiments of the present invention, the length of the third portion is up to half of the length of the special subframe. For example, the length of UPPTS may be set as 0.5 ms. Thus, the length of DWPTS plus GP may be also 0.5 ms, wherein the length of the "S" subframe is 1ms.

In accordance with embodiments of the present invention, the number of resource blocks allocated to the special subframe may be the double of the number of resource blocks allocated to a normal subframe.

The at least one UL/DL configuration according to embodiments of the present invention may comprise UL/DL configurations 0 to 6 specified in 3GPP specifications. According to embodiments of the present invention, the number of HARQ processes for TTI bundling with respect to any of UL/DL configurations 2, 3 and 4 is up to 2.

Figure 3:
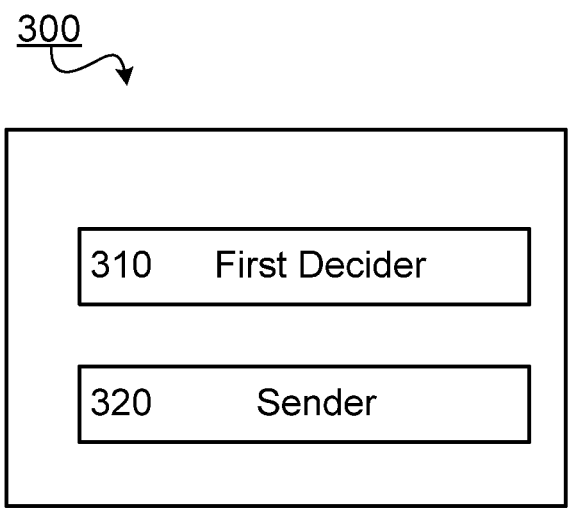
FIG. 3 illustrates a block diagram of an apparatus for use in a BS for enhancing coverage in a TDD system according to embodiments of the invention.

Reference is now made to FIG. 3, which illustrates a block diagram of an apparatus 300 for use in a BS for enhancing coverage in a TDD system according to embodiments of the invention. In these embodiments, there is at least one TDD UL/DL configuration for subframes in the TDD system and the at least one UL/DL configuration comprises at least one special subframe and at least one normal subframe. In accordance with embodiments of the present invention, apparatus 300 may be, for example, a BS, a BSC, a gateway, a relay, a server, or any other applicable device.

According to embodiments of the present invention, the apparatus 300 may comprise: a first decider 310 configured to determine whether a special subframe is to be applied in TTI bundling; and a sender 320 configured to, in response to determining that a special subframe is to be applied in TTI bundling, send to a UE a message with an indication indicating that a special subframe is to be applied in TTI bundling, such that the UE transmits TTI bundling packets on at least one special subframe.

According to embodiments of the present invention, the sender 320 may be configured to, in response to determining that a special subframe is not to be applied in TTI bundling, send to the UE the message without the indication, such that the UE transmits TTI bundling packets only on normal subframes.

According to embodiments of the present invention, wherein the sender 320 comprises: a configuring unit configured to configure a RRC signaling as including the indication; and a sending unit configured to send the RRC signaling to the UE.

According to embodiments of the present invention, a sequence of redundancy versions used in the TTI bundling may be set according to an arrangement of subframes.

According to embodiments of the present invention, the special subframe may comprise a first portion associated with downlink transmission, a second portion associated with a separation for transition of the downlink transmission and uplink transmission, and a third portion associated with the uplink transmission, and wherein the length of the third portion is set long enough to ensure that the uplink transmission of the UE has minimum interference on downlink transmission in an adjacent system.

According to embodiments of the present invention, the length of the third portion may be half of the length of the special subframe.

According to embodiments of the present invention, the number of resource blocks allocated to the special subframe may be the double of the number of resource blocks allocated to a normal subframe.

According to embodiments of the present invention, the at least one UL/DL configuration may comprise UL/DL configurations 0 to 6 specified in 3GPP specifications, and the number of HARQ processes for the TTI bundling with respect to any of UL/DL configurations 2, 3 and 4 may be 2.

Figure 4:
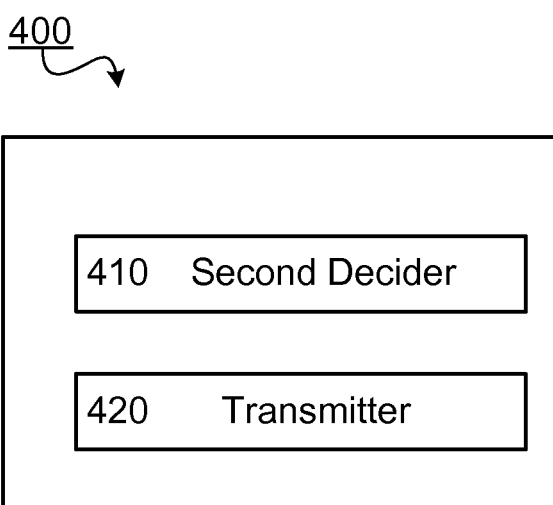
FIG. 4 illustrates a block diagram of an apparatus for use in a UE for enhancing coverage in a TDD system according to embodiments of the invention.

Reference is now made to FIG. 4, which illustrates a block diagram of an apparatus 400 for use in a UE for enhancing coverage in a TDD system according to embodiments of the invention. In these embodiments, there is at least one TDD UL/DL configuration for subframes in the TDD system and the at least one UL/DL configuration comprises at least one special subframe and at least one normal subframe. In accordance with embodiments of the present invention, apparatus 400 may be, for example, a UE, a terminal, a Mobile Station, or any other applicable device.

According to embodiments of the present invention, the apparatus 300 may comprise: a second decider 410 configured to determine whether a message received from a BS includes an indication indicating that a special subframe is to be applied in TTI bundling; and a transmitter 420 configured to, in response to determining that the received message includes the indication, transmit TTI bundling packets to the BS on at least one special subframe.

According to embodiments of the present invention, the transmitter 420 may be further configured to, in response to determining that the received message does not include the indication, transmit TTI bundling packets to the BS only on normal subframes.

According to embodiments of the present invention, the second decider 410 may comprise: a receiving unit configured to receive a Radio Resource Control (RRC) signaling from the BS; and a determining unit configured to determine whether the RRC signaling includes the indication.

According to embodiments of the present invention, the transmitter 420 may comprises: a determining unit configured to determine an arrangement of subframes for the TTI bundling; and a setting unit configured to set a sequence of redundancy versions used in the TTI bundling according to the arrangement of subframes.

According to embodiments of the present invention, the special subframe may comprise a first portion associated with downlink transmission, a second portion associated with a separation for transition of the downlink transmission and uplink transmission, and a third portion associated with the uplink transmission, and the length of the third portion may be set long enough to ensure that the uplink transmission of the UE has minimum interference on downlink transmission in an adjacent system.

According to embodiments of the present invention, the length of the third portion may be half of the length of the special subframe.

According to embodiments of the present invention, the number of resource blocks allocated to the special subframe may be the double of the number of resource blocks allocated to a normal subframe.

According to embodiments of the present invention, the at least one UL/DL configuration may comprise UL/DL configurations 0 to 6 specified in 3GPP specifications, and the number of HARQ processes for the TTI bundling with respect to any of UL/DL configurations 2, 3 and 4 may be 2.

It is noted that the apparatus 300 may be configured to implement functionalities as described with reference to FIG. 1, and the apparatus 400 may be configured to implement functionalities as described with reference to FIG. 2. Therefore, the features discussed with respect to method 100 may apply to the corresponding components of the apparatus 300, and the features discussed with respect to method 200 may apply to the corresponding components of the apparatus 400. It is further noted that the components of the apparatus 300 and the apparatus 400 may be embodied in hardware, software, firmware, and/or any combination thereof. For example, the components of the apparatus 300 or 400 may be respectively implemented by a circuit, a processor or any other appropriate selection device. Those skilled in the art will appreciate that the aforesaid examples are only for illustration not limitation.

In some embodiment of the present disclosure, the apparatus 300 comprises at least one processor. The at least one processor suitable for use with embodiments of the present disclosure may include, by way of example, both general and special purpose processors already known or developed in the future. The apparatus 300 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 300 to at least perform according to method 100 as discussed above.

In some embodiment of the present disclosure, the apparatus 400 comprises at least one processor. The at least one processor suitable for use with embodiments of the present disclosure may include, by way of example, both general and special purpose processors already known or developed in the future. The apparatus 400 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 400 to at least perform according to method 200 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 1 and 2 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method, at a base station, for enhancing coverage in a Time Division Duplex (TDD) system, wherein there is at least one TDD uplink (UL)/downlink (DL) configuration for subframes in the TDD system, and the at least one UL/DL configuration comprises at least one special subframe and at least one normal subframe, and wherein the method comprises:
    determining whether a special subframe is to be applied in Transmission Time Interval (TTI) bundling;
    in response to determining that a special subframe is to be applied in TTI bundling, sending to a user equipment (UE) a message with an indication indicating that a special subframe is to be applied in TTI bundling, such that the UE transmits TTI bundling packets on at least one special subframe; and
    in response to determining that the special subframe is not to be applied in TTI bundling, sending to the UE the message without the indication, such that the UE transmits TTI bundling packets only on normal subframes.

2. The method of claim 1, wherein sending to a UE a message with an indication indicating that a special subframe is to be applied in TTI bundling comprises:
    configuring a Radio Resource Control (RRC) signaling as including the indication; and
    sending the RRC signaling to the UE.

3. The method of claim 1, wherein a sequence of redundancy versions used in the TTI bundling is set according to an arrangement of subframes.

4. The method of claim 1, wherein the special subframe comprises a first portion associated with downlink transmission, a second portion associated with a separation for transition of the downlink transmission and uplink transmission, and a third portion associated with the uplink transmission, and wherein the length of the third portion is set long enough to ensure that the uplink transmission of the UE has minimum interference on downlink transmission in an adjacent system.

5. The method of claim 4, wherein the length of the third portion is half of the length of the special subframe.

6. The method of claim 1, wherein the number of resource blocks allocated to the special subframe is the double of the number of resource blocks allocated to a normal subframe.

7. The method of claim 1, wherein the at least one UL/DL configuration comprises UL/DL configurations 0 to 6 specified in 3GPP specifications, and wherein the number of HARQ processes for the TTI bundling with respect to any of UL/DL configurations 2, 3 and 4 is up to 2.

8. A method, at a user equipment (UE), for enhancing coverage in a Time Division Duplex (TDD) system, wherein there is at least one TDD uplink (UL)/downlink (DL) configuration for subframes in the TDD system, and the at least one UL/DL configuration comprises at least one special subframe and at least one normal subframe, and wherein the method comprises:
  determining whether a message received from a base station (BS) includes an indication indicating that a special subframe is to be applied in Transmission Time Interval (TTI) bundling;
  in response to determining that the received message includes the indication, transmitting TTI bundling packets to the BS on at least one special subframe; and
  in response to determining that the received message does not include the indication, transmitting TTI bundling packets to the BS only on normal subframes.

9. The method of claim 8, wherein determining whether a message received from a BS includes an indication indicating that a special subframe is to be applied in TTI bundling comprises:
  receiving a Radio Resource Control (RRC) signaling from the BS; and
  determining whether the RRC signaling includes the indication.

10. The method of claim 8, wherein transmitting TTI bundling packets to the BS on at least one special subframe comprises:
  determining an arrangement of subframes for the TTI bundling; and
  setting a sequence of redundancy versions used in the TTI bundling according to the arrangement of subframes.

11. The method of claim 8, wherein the special subframe comprises a first portion associated with downlink transmission, a second portion associated with a separation for transition of the downlink transmission and uplink transmission, and a third portion associated with the uplink transmission, and wherein the length of the third portion is set long enough to ensure that the uplink transmission of the UE has minimum interference on downlink transmission in an adjacent system.

12. The method of claim 11, wherein the length of the third portion is half of the length of the special subframe.

13. The method of claim 8, wherein the number of resource blocks allocated to the special subframe is the double of the number of resource blocks allocated to a normal subframe.

14. The method of claim 8, wherein the at least one UL/DL configuration comprises UL/DL configurations 0 to 6 specified in 3GPP specifications, and wherein the number of HARQ processes for the TTI bundling with respect to any of UL/DL configurations 2, 3 and 4 is up to 2.

15. An apparatus for enhancing coverage in a Time Division Duplex (TDD) system, wherein there is at least one TDD uplink (UL)/downlink (DL) configuration for subframes in the TDD system, and the at least one UL/DL configuration comprises at least one special subframe and at least one normal subframe, and wherein the apparatus comprises:
  a first decider configured to determine whether a special subframe is to be applied in TTI bundling; and
  a sender configured to, in response to determining that a special subframe is to be applied in Transmission Time Interval (TTI) bundling, send to a user equipment (UE) a message with an indication indicating that a special subframe is to be applied in TTI bundling, such that the UE transmits TTI bundling packets on at least one special subframe,
  wherein the sender is further configured to, in response to determining that a special subframe is not to be applied in TTI bundling, send to the UE the message without the indication, such that the UE transmits TTI bundling packets only on normal subframes.

16. The apparatus of claim 15, wherein the sender comprises:
  a configuring unit configured to configure a Radio Resource Control (RRC) signaling as including the indication; and
  a sending unit configured to send the RRC signaling to the UE.

17. The apparatus of claim 15, wherein the special subframe comprises a first portion associated with downlink transmission, a second portion associated with a separation for transition of the downlink transmission and uplink transmission, and a third portion associated with the uplink transmission, and wherein the length of the third portion is set long enough to ensure that the uplink transmission of the UE has minimum interference on downlink transmission in an adjacent system.

18. The apparatus of claim 17, wherein the length of the third portion is half of the length of the special subframe.

19. The apparatus of claim 15, wherein the number of resource blocks allocated to the special subframe is the double of the number of resource blocks allocated to a normal subframe.

20. An apparatus for enhancing coverage in a Time Division Duplex (TDD) system, wherein there is at least one TDD uplink (UL)/downlink (DL) configuration for subframes in the TDD system, and the at least one UL/DL configuration comprises at least one special subframe and at least one normal subframe, and wherein the apparatus comprises:
  a second decider configured to determine whether a message received from a base station (BS) includes an indication indicating that a special subframe is to be applied in Transmission Time Interval (TTI) bundling; and
  a transmitter configured to, in response to determining that the received message includes the indication, transmit TTI bundling packets to the BS on at least one special subframe,
  wherein the transmitter is further configured to, in response to determining that the received message does not include the indication, transmit TTI bundling packets to the BS only on normal subframes.

21. The apparatus of claim 20, wherein the second decider comprises:
  a receiving unit configured to receive a Radio Resource Control (RRC) signaling from the BS; and
  a determining unit configured to determine whether the RRC signaling includes the indication.

22. The apparatus of claim 20, wherein the transmitter comprises:
  a determining unit configured to determine an arrangement of subframes for the TTI bundling; and
  a setting unit configured to set a sequence of redundancy versions used in the TTI bundling according to the arrangement of subframes.

* * * * *